May 13, 1952     F. W. OPP     2,596,504
APPARATUS FOR TREATING SOIL
Filed Oct. 13, 1947     2 SHEETS—SHEET 1
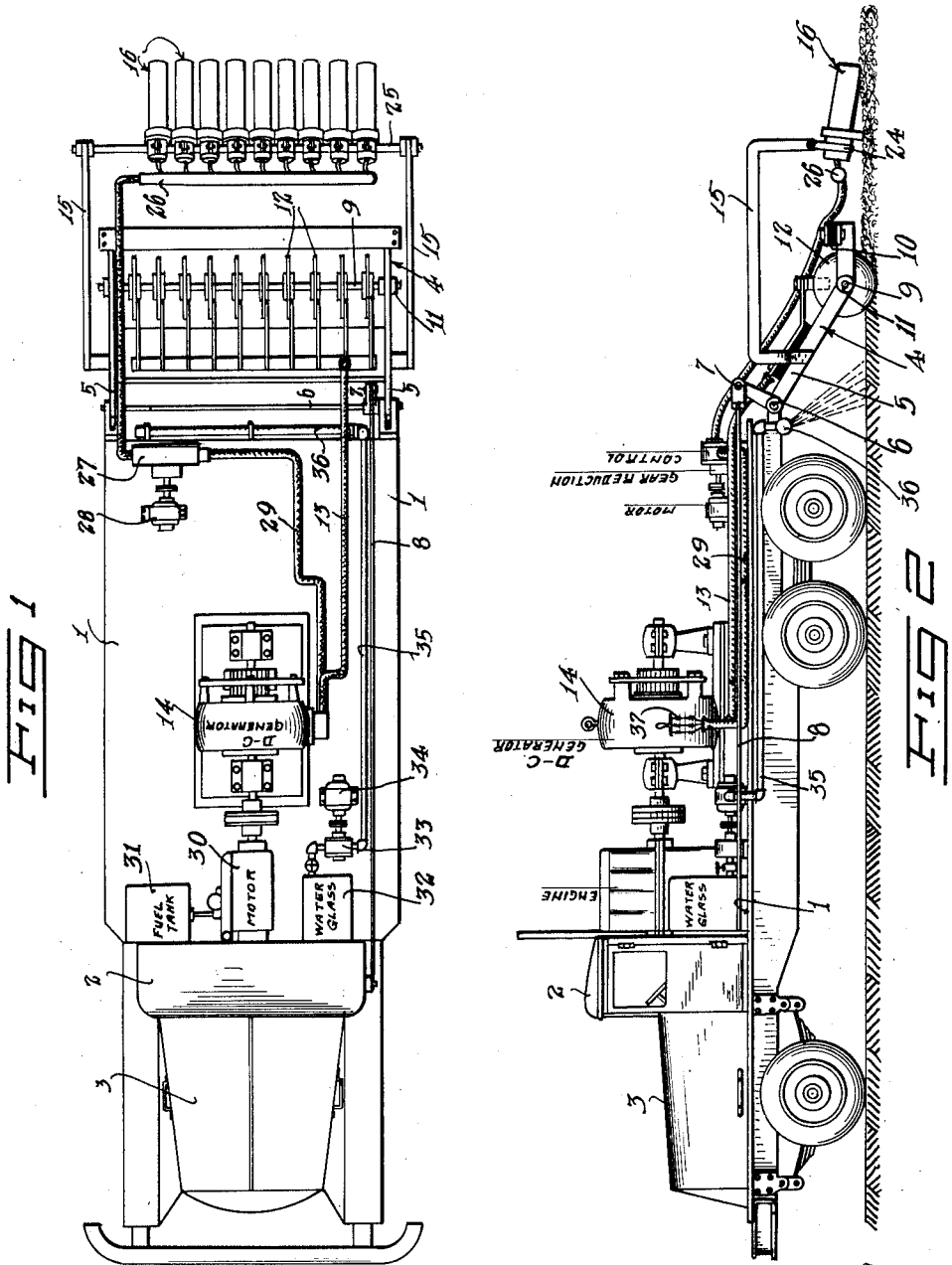

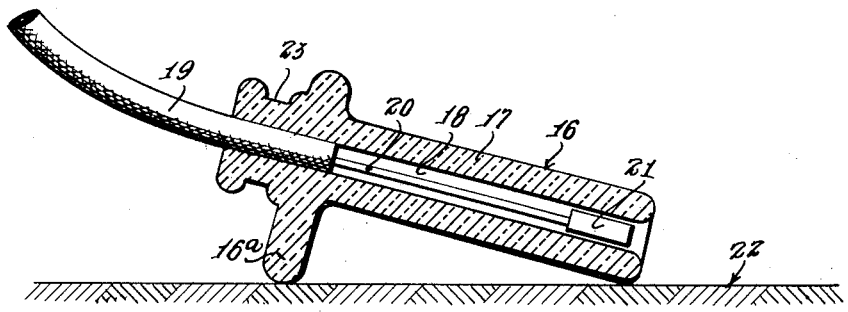
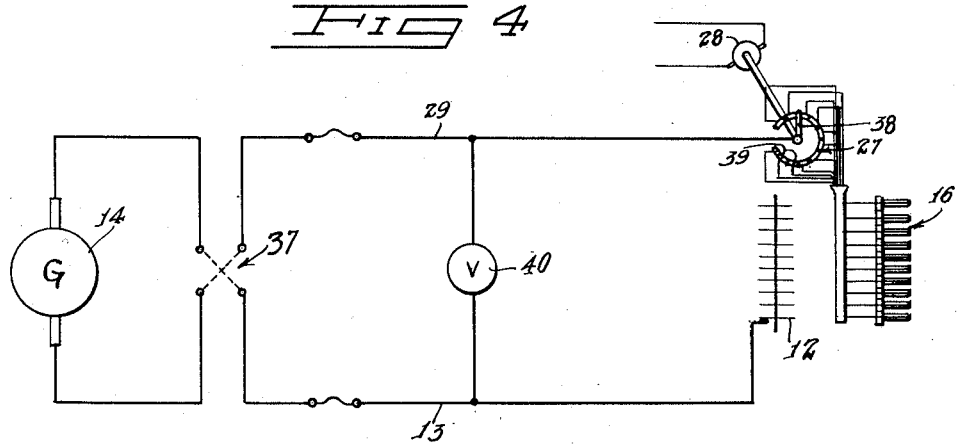

UNITED STATES PATENT OFFICE 2,596,504

APPARATUS FOR TREATING SOIL

Fred W. Opp, Costa Mesa, Calif., assignor of one-half to Walter C. Collins, Santa Ana, Calif.

Application October 13, 1947, Serial No. 779,455

6 Claims. (Cl. 47—1.3)

This invention relates to a method and apparatus for treating soil for the purpose of enhancing the growth of plants, and for killing weeds and destroying bacteria, fungi, and other elements present in the soil which are harmful to growth of plants.

The present invention includes the discovery that the growth of plants may be materially enhanced by subjecting the soil in which the plants are to grow to an arc discharge treatment. It has been found, in accordance with the present invention, that the treatment of soil by means of an arc discharge has the effect of rendering certain minerals present in the soil more accessible to the growing of plants. That is to say, where the soil contains naturally all of the minerals necessary for the proper growth of plants, the growth of the plants may, however, be stimulated by an arc treatment of the soil, with the result that the plants grow more rapidly and to greater height. The explanation for this improvement of the soil effected by the arc treatment in such cases is thought to reside in the fact that the arc acts upon the water content of the soil through either ozone formation or ozmatic action to increase the solubility of the minerals present, and thereby facilitate the plants acquiring such minerals from the treated soil.

The present invention also includes the discovery that by utilization of an arc treatment of soil it is possible to introduce into the soil certain metals or compounds of metals which will be beneficial to the growth of plants, such treatments being of particular value in connection with the soil's deficiency in the metals so introduced. This introduction of the metals into the soil is effected in accordance with the method and apparatus of the present invention by forming the electrodes from which the arc is to be formed of the metal which is to be introduced into the soil, either in the metallic form or as a compound of said metal. The metallic elements or compounds so introduced into the soil by the arc treatment of the method and apparatus of the present invention are introduced into the soil in a form of a maximum availability or maximum effectiveness upon the plants to be grown.

In the process and apparatus of the present invention the soil to be treated is subjected to arcing action by connecting one side of a high D. C. potential source to the ground while the other side of such a high potential source is connected to an electrode maintained insulated from the soil to be treated, the insulation, however, being insufficient to hold the voltage applied to the electrode as these insulated electrodes are drawn over the soil to be treated, arcing discharge to the soil on curves. This arcing discharge has beneficial effects upon the minerals of the soil, acting probably primarily through the water content of the soil, and may also be utilized for introducing into the soil various metals and metal compounds in steps beneficial thereto.

There are a large number of metals or metallic compounds which may be introduced into the soil in a beneficial manner by the method and apparatus of the present invention. For example, by utilizing electrodes composed of or containing such elements as iron, magnesium, arsenic, copper, manganese, and silver it is possible to introduce these metals or compounds thereof into the soil by the process of the present invention. Thus, iron or oxides of iron are introduced beneficially into the soils deficient in iron by having the positive electrode of the high voltage source the insulated electrode, and forming this electrode of iron. Magnesium may be introduced in a similar manner by using a positive insulated electrode of magnesium. Arsenic is introduced into the soil best by making the insulated electrode of arsenic, the introduction being best effected, in this case, by grounding the positive electrode of the system and utilizing the arsenic electrode as an insulated negative electrode of the system. Similarly, the magnesium is introduced into the ground by including this as the insulated negative electrode. In such cases, a ferro magnesium electrode may be utilized. In similar manner, copper or silver may be introduced into the soil, these metals being utilized for the insulated electrode, preferably the positive electrode of the system.

Iron is an important element for plant growth and, as an example of the present invention, it has been found that as much as a 78% increase in the growth of the plants may be effected greatly by subjecting the soil between young growing plants to the arc treatment of the present invention, utilizing iron as an electrode and so introducing iron compounds into the soil. A small amount of such elements as magnesium, arsenic, copper, manganese, and silver are also beneficial to the soil and may be similarly introduced.

Certain of the metals above listed are harmful to plant growth if present in excessive quantities, and are also effective for killing and destroying certain bacteria and fungi present in soil. The present invention includes a variation in treatment in which these elements are introduced into the soil before planting of the intended plants, in such quantities as to be destructive to undesirable weed growth, or bacteria or fungi present in the soil. In this way, the process of the present invention acts to destroy undesirable plants and other undesired elements of soil before planting of the intended crop.

The method and apparatus of the present invention will be apparent from the following description of a preferred form of the invention, which description is given in connection with the accompanying drawings, in which:

Figure 1 is a plan view of an apparatus suitably embodying the present invention and suitable for conducting the process of the present invention.

Figure 2 is an elevation of the apparatus shown in Figure 1.

Figure 3 is an enlarged section of one of the electrodes.

Figure 4 is an electrical diagram.

In the drawings the apparatus of the present invention is shown as constructed in a portable form so the apparatus is adapted to be moved over a field for applying the treatment progressively to the soil passed over by the apparatus. As shown in the drawings the apparatus comprises a truck which may be of conventional form having the floor 1 and driver's cab 2 mounted thereon. The truck is preferably driven by a gasoline motor mounted under a hood 3 in accordance with conventional trucks.

At the end of the truck there is pivoted a frame 4 which includes the crank arms 5 pivoted to the truck as indicated at 6. These crank arms are pivoted as indicated at 7 to rods 8 by means of which the frame 4 may be pivoted up to an inoperative position when desired. The crank arms 5 are mounted on the axle 9. The body of the axle 9 is of metal but it has ends 10 of insulating material mounted in bearings 11 and the arms 5. At suitably spaced apart points along the axle 9 are fused metallic disks 12 which are intended to roll upon the ground as indicated in Figure 2, preferably cutting somewhat into the ground. These disks 12 form one of the electrodes of an arcing system and for this purpose the shaft 9 is indicated as electrically connected by the lead 13 to one side of a generator 14.

There is also provided a pair of inverted U-shaped arms 15 attached to the arms 5, which extend some distance to the rear of the axle 9 and there serve to suspend a multiplicity of electrode members 16. These electrode members, as most clearly illustrated in Figure 3, each comprise a housing 17 of insulating material having a central bore 18. Into one end of the bore 18 enters an insulated electrical conduit 19.

The metallic conduit 20 extends towards the other end and there joins an electrode tip member 21 which is formed of the metal to be introduced into the soil. This electrode tip member is located near the end of the bore 18 but is spaced by the insulation thereof at a small distance, such as ¼ or ⅜ of an inch from the surface of the soil to be treated, which is generally indicated at 22. At the inner end, adjoining the electrical conduit, the insulating member 17 is provided with a groove 23 by which metallic straps, as indicated at 24, may suspend the electrodes 16 from a transverse bar 25 supported by the ends of the inverted U-shaped arms 15. The insulator member 17 may also have enlargements such as indicated at 16a, which operate as skids so that in operation the insulated electrodes may be dragged along the ground behind the truck in the position indicated in Figure 3.

The conduits 19 which connect with the individual electrodes 16 may be united in a cable as indicated at 26 and lead to a distributor 27 driven by the motor 28. A conduit 29 connects the distributor with the generator 14. On the floor 1 of the truck is mounted a motor 30 for driving the generator 14 fed by a fuel tank 31.

There may be also provided on the truck a container such as indicated at 32, connected by a pump 33, driven by a motor 34 to a line 35 leading to a spray pipe 36. By means of this apparatus it is possible to spray into the soil material such as water glass to facilitate the intended treatment. In certain instances in the use of the present invention it will be found that the quality of metallic elements to be inroduced into the soil by the arc treatment will be beneficially increased by spraying in front of the arc treatment small quantities of soluble material such as water glass. Furthermore, the use of the water glass spray is effective in establishing an arc of the desired character. Where the soil is reasonably conductive the use of the water glass spray may not be important, but in the case of very dry soil which does not form a very good ground the establishment of the desired arc is quickly facilitated by the use of the water glass spray.

Referring to figure 4, an electric diagram is shown in which the generator 14 is shown connected with a reversing switch 37 by means of which a reversal may be effected in the brushes of the generator 14 which are to be grounded to the earth through the disks 12. The conduit 13 leads from the reversing switch to the grounding electrodes 12 while the other conduit 29 leads to a driven arm 38 of the distributor 27 which has separately spaced and insulated contact segments 39 individually connected to the individual insulated electrodes 16. The motor 28 used to drive the arm 27 is shown as connected across the generator leads 13 and 29. Also, a volt meter, as indicated at 40, may be connected across these lines.

It is to be understood that the generator 14 of the present invention should be a high voltage generator capable of generating substantial electrical energy. For example, the generator should develop about 18,000 volts or higher, and 10 or more kilowatts of electrical power. I have found it preferable to use sufficient of the insulated electrodes 16, spaced apart as indicated, and thus effectively treat at one passage of the truck a strip of soil of about three to twelve feet in width. Generally, the truck should be driven forward during treatment at a slow speed, such as three to five miles per hour, in order to allow time for efficient action upon the soil.

In the process of the present invention the treatment may in certain cases be applied to the soil before planting the soil, and in other cases the treatment may be applied to the soil after planting. In such cases, if the plants have matured, then the electrodes 16 should be moved over the intervening soil between plants.

While the particular voltage required to be generated by the generator will, of source, vary with different treatments, there should generally be included a generating apparatus capable of generating a voltage between 6,000 and 100,000 volts and adapted for applying to the electrodes from 10 to 100 kilowatts of power for the arc treatment. In certain cases the electrodes 16 might be parallel but in general it is preferable to effect the discharge from the electrodes successfully by the utilization of the distributor, as indicated, in order to assure adequate control of the arcing treatment.

By means of the method and apparatus of the present invention it has been found possible to stimuate the plant growth of many soils. In certain cases the principal benefit is derived solely from the arcing treatment, whereas in other cases, the introduction of different minerals or metallic compounds into the soil by the method and apparatus of the present invention is further helpful. Those skilled in the art will recognize that the particular mineral to be added by the method and apparatus of the present invention is best determined by analysis of the soil to determine the mineral element with respect to which said soil is most deficient. Substantial differences in the growth of various plants have been noted by treatment of the soil with each of the electrodes hereinbefore described.

While the particular form of the apparatus and method herein described as an example of the invention is well adapted to carry out the objects of the invention, varied modifications and changes may be made and this invention is of the scope set forth in the appended claims.

I claim:

1. An apparatus for treating the soil which comprises a source of direct current potential; means for grounding one side of said source to the soil to be treated; means for supporting a plurality of electrodes in contact with the soil to be treated, said electrodes having insulations preventing direct electric contact with the soil to be treated so as to be adapted for arc discharge only to the soil, the insulation-providing means by which the electrodes may be supported treat the soil at a fixed distance, a distributor means connected to said electrodes for successively applying the potential thereto, said distributor being connected to the opposite side of the potential source from that grounded.

2. An apparatus for treating the soil in situ, which comprises a vehicle adapted to be moved over the soil to be treated, a set of grounding electrodes supported by said vehicle and contacting the soil to be treated; a plurality of insulated electrodes supported by said vehicle and in contact with the soil to be treated, the insulation of said latter electrodes preventing direct electrical connection with the soil so as to confine the treatment to arc discharge; a source of D. C. electrical potential mounted on said vehicle and connected to both of said electrodes, and a distributor in the connection between the source of electric potential and insulated electrodes for successively connecting the insulated electrodes to the potential source.

3. An apparatus for treating the soil in situ, which comprises a vehicle adapted to be moved over the soil to be treated, a set of grounding electrodes supported by said vehicle and contacting the soil to be treated; a plurality of insulated electrodes supported by said vehicle and in contact with the soil to be treated, the insulation of said latter electrodes preventing direct electrical connection with the soil so as to confine the treatment to arc discharge; a source of D. C. electrical potential mounted on said vehicle and connected to both of said electrodes; and means on said vehicle for spraying water glass onto the soil to be treated in advance of the contact of said soil by said electrodes.

4. An apparatus for treating the soil in situ, which comprises a vehicle adapted to be moved over the soil to be treated, a set of grounding electrodes supported by said vehicle and contacting the soil to be treated; a plurality of insulated electrodes supported by said vehicle and in contact with the soil to be treated, the insulation of said latter electrodes preventing direct electrical connection with the soil so as to confine the treatment to arc discharge; a source of D. C. electrical potential mounted on said vehicle and connected to both of said electrodes; and a distributor in the connection between the source of electric potential and insulated electrodes for successively connecting the insulated electrodes to the potential source; and means on said vehicle for spraying water glass onto the soil to be treated in advance of the contact of said soil by said electrodes.

5. An apparatus for treating the soil, which comprises a vehicle adapted to be moved over the soil to be treated; a source of D. C. electrical potential mounted on said vehicle; means for grounding one side of said source to the soil to be treated and a plurality of electrodes connected to the other side of said source for effecting arc discharge treatment to the soil, said electrodes being mounted by said vehicle in contact with the soil to be treated, each of the said latter electrodes having an insulating casing which protects the metallic element of the electrode from physical contact with the soil to be treated.

6. An apparatus for treating the soil, which comprises a source of direct current potential; means for grounding to the soil to be treated one side of the direct current potential, and a multiplicity of electrodes connected to the other side of the electrical potential for effecting an arc discharge to the soil to be treated, said electrodes being provided with means for maintaining the electrode tips insulated from direct contact with the soil to be treated, the potential source being adapted to effect an arc discharge from said insulated electrodes to the soil, the insulated electrodes having electrode tips formed of a metal which it is desired to be introduced into the soil.

FRED W. OPP.

REFERENCES CITED

The following references are of record in the file of this patent:

UNITED STATES PATENTS

| Number | Name | Date |
| --- | --- | --- |
| 565,671 | Cummings | Aug. 11, 1896 |
| 779,791 | Lokuciejewsky | Jan. 10, 1905 |
| 1,172,367 | Kitsee | Feb. 22, 1916 |
| 2,007,383 | Opp | July 9, 1935 |

FOREIGN PATENTS

| Number | Country | Date |
| --- | --- | --- |
| 167,608 | Great Britain | Aug. 18, 1921 |

OTHER REFERENCES

Chemical Abstracts, vol. 31, published 1937, column 3616.